United States Patent
Bjelobradic et al.

(10) Patent No.: US 9,964,133 B2
(45) Date of Patent: May 8, 2018

(54) SCREW ELEMENTS HAVING A TOOL ENGAGEMENT PORTION

(71) Applicant: FONTANA FASTENERS R.D. S.r.l., Veduggio Con Colzano (MB) (IT)

(72) Inventors: Zoran Bjelobradic, Calw (DE); Sergio Cattaneo, Veduggio Con Colzano (MB) (IT); Sven Fischer, Calw (DE); Frank Kirchherr, Althengstett (DE); Paolo Redaelli, Veduggio Con Colzano (MB) (IT)

(73) Assignee: FONTANA FASTENERS R.D. S.R.L., Veduggio Con Colzano (Monza E Brianza) (IT)

( * ) Notice: Subject to any disclaimer, the term of this patent is extended or adjusted under 35 U.S.C. 154(b) by 94 days.

(21) Appl. No.: 15/103,392

(22) PCT Filed: Oct. 14, 2014

(86) PCT No.: PCT/EP2014/072029
§ 371 (c)(1),
(2) Date: Jun. 10, 2016

(87) PCT Pub. No.: WO2015/086196
PCT Pub. Date: Jun. 18, 2015

(65) Prior Publication Data
US 2016/0312816 A1    Oct. 27, 2016

(30) Foreign Application Priority Data
Dec. 14, 2013 (DE) .......................... 10 2013 021 238

(51) Int. Cl.
*F16B 23/00* (2006.01)

(52) U.S. Cl.
CPC ...... *F16B 23/0061* (2013.01); *F16B 23/0038* (2013.01); *F16B 23/0092* (2013.01)

(58) Field of Classification Search
CPC .............. F16B 23/0061; F16B 23/0092; F16B 23/0038

(Continued)

(56) References Cited

U.S. PATENT DOCUMENTS 3,003,379 A * 10/1961 Pribitzer ................. B25B 13/02
411/427
3,415,154 A * 12/1968 Skierski .............. F16B 23/0076
411/403

(Continued)

FOREIGN PATENT DOCUMENTS

FR     2097684 A5    3/1972
GB     2260587 A     4/1993
WO     2010014881 A1  2/2010

*Primary Examiner* — Gary W Estremsky
(74) *Attorney, Agent, or Firm* — Robert E. Alderson, Jr.

(57) ABSTRACT

Screw elements are provided which include a shank having a thread and a head connected to the shank, the head having a tool engagement portion which comprises six corner domes arranged evenly distributed in the peripheral direction of the head and comprising respective flanks, by which the head can be brought into positive cooperation with a hexagon socket of a tool for tightening of the screw element, wherein respective recesses are arranged peripherally between the corner domes, and wherein the flanks of the corner domes are respectively provided at least partially with a radius.

3 Claims, 3 Drawing Sheets

(58) Field of Classification Search
USPC .............................. 411/402, 405, 410, 919
See application file for complete search history.

(56) References Cited

U.S. PATENT DOCUMENTS

| | | | | |
|---|---|---|---|---|
| 4,073,160 | A * | 2/1978 | Perret | B25B 13/065 411/403 |
| 4,228,722 | A * | 10/1980 | Kazino | F16B 23/0038 411/403 |
| 4,361,412 | A * | 11/1982 | Stolarczyk | F16B 23/0007 411/402 |
| 5,137,407 | A * | 8/1992 | Yamamoto | F16B 23/003 411/404 |
| 5,324,149 | A * | 6/1994 | Bainbridge | F16B 37/14 411/377 |
| 6,017,177 | A * | 1/2000 | Lanham | F16B 23/003 411/402 |
| 6,321,623 | B1 * | 11/2001 | Dykes | B25B 13/065 411/402 |
| 8,454,288 | B2 * | 6/2013 | Hui | F16B 23/0038 411/402 |
| 2003/0044257 | A1 * | 3/2003 | Siegel | B21K 1/46 411/402 |
| 2010/0143073 | A1 * | 6/2010 | Chen | A61B 17/8605 411/408 |
| 2011/0070051 | A1 * | 3/2011 | Chang | F16B 23/0092 411/405 |

* cited by examiner

SCREW ELEMENTS HAVING A TOOL ENGAGEMENT PORTION

CROSS-REFERENCE TO RELATED APPLICATIONS

This application is a National Phase Application of PCT International Application No. PCT/EP2014/072029, International Filing Date, Oct. 14, 2014, claiming priority to German Patent Application No. 10 2013 021 238.3, filed Dec. 14, 2013 each of which is hereby incorporated by reference in its entirety.

FIELD OF THE INVENTION

The invention relates to screw elements as described and claimed herein.

BACKGROUND OF THE INVENTION

Such a screw element in the form of a fastening element can be taken as known, for example, from WO 2010/014881 A1. The screw element comprises a shank having a thread. In addition, the screw element comprises a head connected to the shank. The head has a tool engagement portion having six corner domes arranged evenly distributed in the circumferential direction of the head. The corner domes in turn have respective flanks, by which the head can be brought into positive cooperation with a hexagon socket of a tool for tightening of the screw element.

Such a tool is constituted, for example, by a box spanner having a socket which has a tool engagement portion in the form of a hexagon or double hexagon. This hexagon or double hexagon is constituted by a hexagon socket, in which the tool engagement portion or the flanks of the screw elements can be at least partially arranged.

The flanks of the screw element can thus cooperate positively with the hexagon socket of the tool, so that torques, for the screwing down and tightening of the screw element, can be transmitted from the tool to the screw element. By the use of the tool, a person can hence, for example, screw down or tighten the screw element. Between the corner domes in the circumferential direction, respective recesses are arranged. This means that respectively two successive corner domes in the circumferential direction of the head are spaced apart by a recess arranged between these corner domes.

SUMMARY OF THE INVENTION

The object of the present invention is to further develop a screw element of the type stated in the introduction such that a particularly low weight of the screw element can be realized and that the screw element can be used in a particularly flexible manner.

This object is achieved by a screw element as described and claimed herein. Non-limiting alternative embodiments are also described and claimed herein.

In order to further develop screw elements of the type described and claimed herein such that a particularly low weight and particularly flexible applicability or usability of the screw element can be realized, the invention includes embodiments in which the flanks of the corner domes are respectively provided at least partially with a radius. It is thus possible, in particular, to bring the screw element via the flanks of the corner domes both into positive cooperation with a traditional hexagon socket of a tool for tightening of the screw element and into positive cooperation with a so-called surface drive mechanism for tightening of the screw element, wherein the radii on the flanks serve for the vertical absorption of forces. In other words, the screw element according to the invention can be screwed down tightly by means of different tools.

As a result of the radii on the corner domes, a box spanner can, for example, be particularly advantageously applied to or brought into operative connection with the tool engagement portion of the screw element. Furthermore, as result of the corner radii, a particularly advantageous force flow can be represented, so that the screw element can be tightened without damage even with high torques.

The screw element can thus be configured as a hexagon flange screw, in particular for passenger vehicles and commercial vehicles, which is optimized in terms of weight and installation space and which can be installed or mounted with traditional hexagon or double hexagon box spanners and by means of a surface drive mechanism.

A further possibility of realizing a particularly low weight of the screw element is to provide a so-called cup arrangement centrally in the head of the screw element. This means that it is preferably provided that, in the radial direction of the shank, a recess (cup) of the head is arranged between the corner domes. The provision of the recess in the circumferential direction between the corner domes helps to realize a merely particularly low weight of the screw element.

In addition, it is possible to reduce the height of the head by at least substantially 17 percent in relation to a traditional screw element without, however, hereby altering the collar height. Furthermore, a reduction of the overall height can be realized, so that the weight of the screw element can be kept particularly low. Also the reduction of the collar height in relation to a traditional screw element represents a possibility of reducing the weight.

Further advantages, features and details of the invention emerge from the following description of a preferred illustrative embodiment and on the basis of the drawing. The features and feature combinations stated above in the description, as well as the features and feature combinations stated below in the figure description, and/or features and feature combinations shown solely in the figures, can be used not only in the respectively defined combination, but also in other combinations or in isolation, without departing from the scope of the invention.

DETAILED DESCRIPTION

Figure 1:
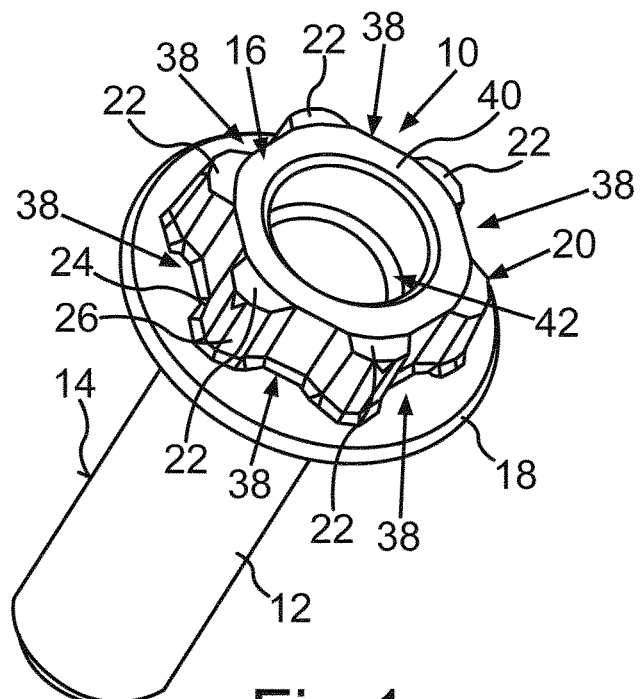
FIG. 1 is a schematic perspective view of a screw element for a motor vehicle, comprising a shank having a thread and comprising a head connected to the shank, said head having a tool engagement portion which has six corner domes arranged evenly distributed in the circumferential direction of the head and having respective flanks by which the head can be brought into positive cooperation with a hexagon socket of a tool for the tightening of the screw element, wherein respective recesses are arranged peripherally between the corner domes, and wherein the flanks of the corner domes are respectively provided at least partially with a radius.
Figure 2:
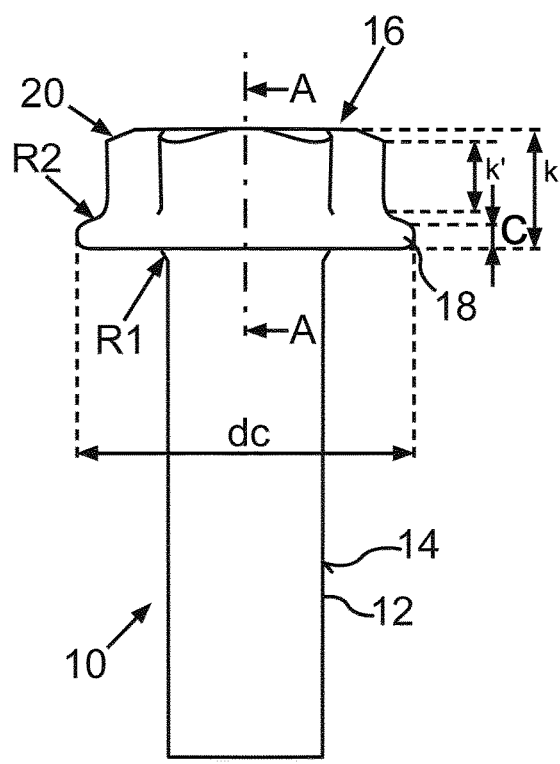
FIG. 2 is a schematic side view of the screw element.

FIGS. 1 and 2 show a screw element, denoted in its entirety by 10. The screw element 10 is constituted by a fastening element, by means of which, for example, a first component can be fastened to a second component of a motor vehicle. The screw element 10 has a shank 12 having a thread in the form of an external thread 14, as well as a head 16 connected to the shank 12. The screw element 10 is formed, for example, of a metallic material. The head 16 is configured in one piece with the shank 12. In the direction of longitudinal extent of the shank 12, a collar 18 is configured between the head 16 and the shank 12. The screw element 10 can here be supported by means of the collar 18 against the first component in order, in the tightened state of the screw element 10, to clamp the first component against the corresponding, second component.

As can be seen from FIG. 1, the head 16 has a tool engagement portion 20, which is configured as an external polygon. The tool engagement portion 20 has six corner domes 22, which are arranged evenly distributed in the circumferential direction of the head 16. In other words, the corner domes 22 are arranged in pairs at equal distance apart in the circumferential direction of the head 16. The corner domes 22 have respective flanks 24, 26. In other words, each of the corner domes 22 has a flank 24 and a flank 26. Imaginary tangential planes of the flanks 24, 26 of the respective corner dome 22 here form an angle of 120 degrees. This is particularly evident from FIG. 5, in which the tangential planes are denoted by 28 and 30.

Figure 6:
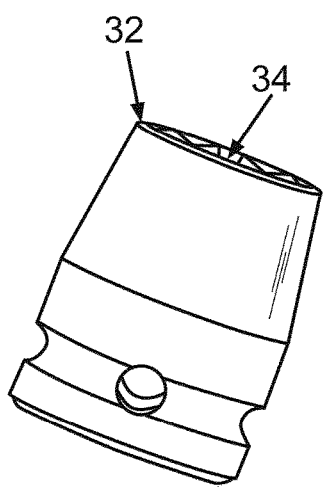
FIG. 6 is a schematic and perspective side view of a tool having a hexagon socket for the tightening of the screw element.
Figure 7:
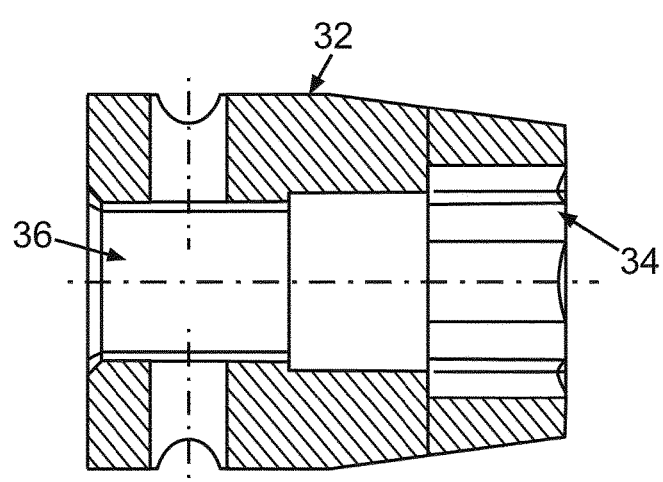
FIG. 7 is a schematic longitudinal sectional view of the tool.

Via the flanks 24, 26, the head 16 can be brought into positive cooperation with a hexagon socket of a tool for the screwing down or tightening of the screw element 10. Such a tool is constituted, for example, by a socket 32, discernible from FIGS. 6 and 7, which has an internal polygon 34 as the tool engagement portion. The internal polygon 34 can be configured, for example, as a hexagon socket. The tool engagement portion 20, configured as an external polygon, of the screw element 10 can here be arranged at least partially in the corresponding internal polygon 34. The internal polygon 34 can cooperate positively with the flanks 24, 26, so that torques can be transmitted from the socket 32 to the screw element 10 via the tool engagement portion 20.

The socket 32 further has a socket opening 36, by which the socket 32 can be placed onto a box spanner and can thereby be positively connected to the box spanner. By the use of the box spanner, the socket 32 and the tool engagement portion 20, a person can hence, for example, screw down or tighten the screw element 10 with high torques.

In particular, it is possible for the tool engagement portion 20 to be brought into positive cooperation with standard hexagon sockets, internal double hexagons and with a surface drive tool in order to tighten the screw element 10 by means of these standard hexagon sockets or surface drive tools.

Figure 3:
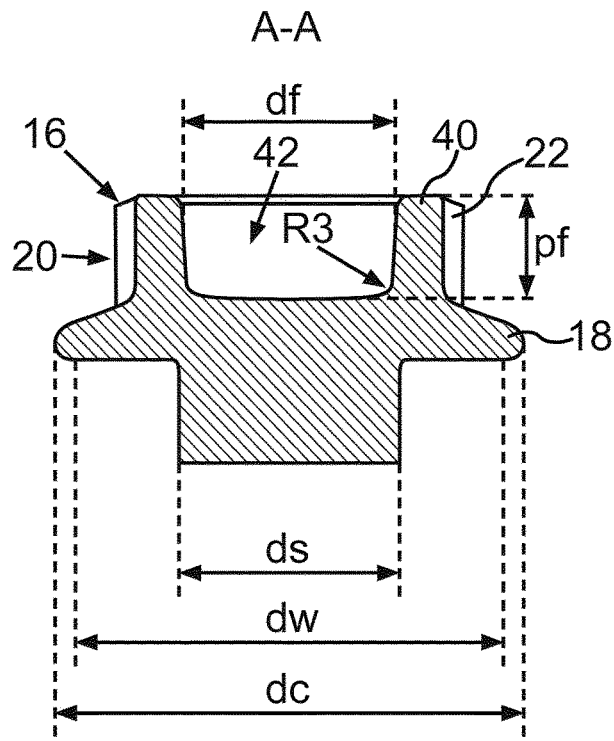
FIG. 3 is selectively a schematic sectional view of the screw element along a sectional line A-A shown in FIG. 2.

From FIG. 2, a large number of measurements R1, R2, dc, C, k and k' of the screw element 10 can be seen. From FIG. 3, further measurements df, pf, R3, ds, dw of the screw element 10 can be seen. It can be seen particularly clearly from FIGS. 1 and 4 that respective recesses 38 are arranged in the circumferential direction between the corner domes 22. It can further be seen that the head 16 has a support ring 40, which in turn has a diameter dfa. The diameter dfa is constituted by the external diameter of the load-bearing support ring for the corner domes 22. From FIG. 4, it can be seen that the external diameter, that is to say the diameter dfa of the support ring 40, is particularly large and is not interrupted.

Figure 4:
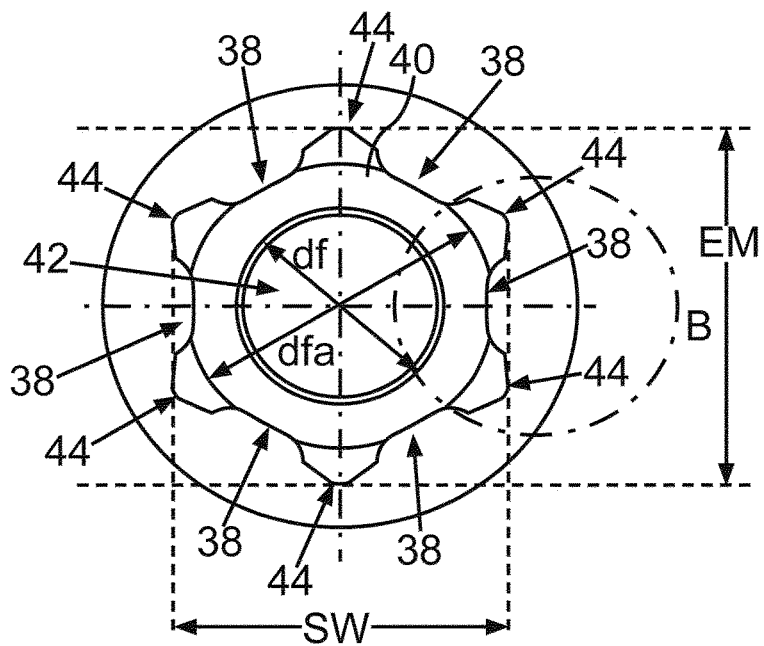
FIG. 4 is a schematic top view of the screw element.

Between the corner domes 22 in the radial direction, a central recess in the form of a so-called cup arrangement 42 of the head 16 is provided. The weight of the screw element 10 can hereby be kept particularly low. Furthermore, the flanks 24, 26 of the respective corner dome 22 are connected to each other in the circumferential direction by a transition region 44. This means that the respective corner domes 22 have rounded corners or tips. In FIG. 4, the so-called width across corners WAC, as well as the width across flats WAF, of the tool engagement portion 20 is also represented. The width across corners WAC here denotes the distance of the rounded tips from two corner domes 22 which are situated opposite each other in the radial direction of the shank 12.

Figure 5:
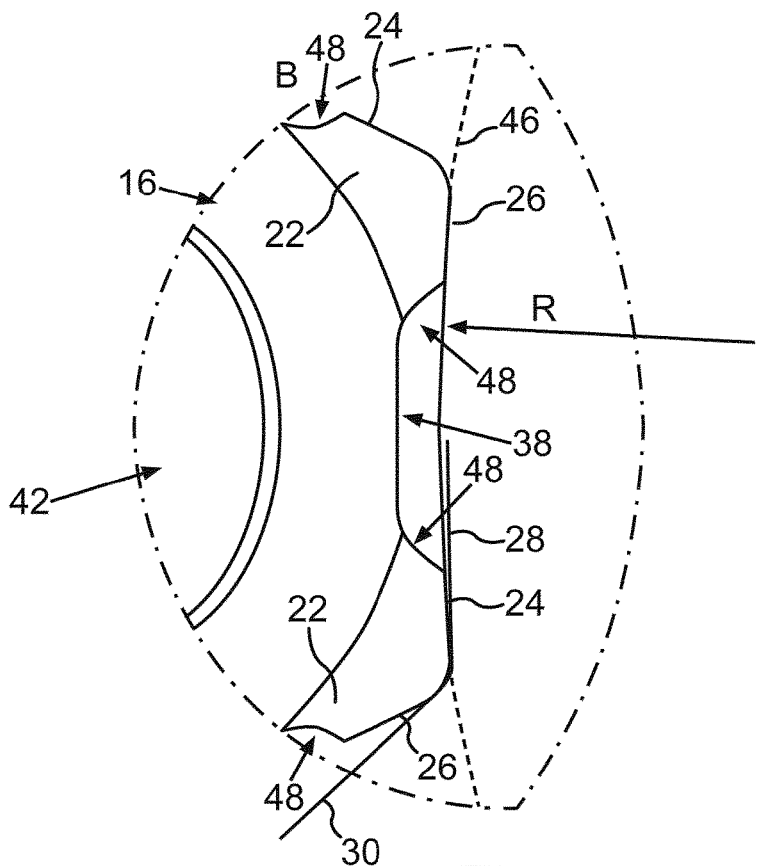
FIG. 5 is a schematic and enlarged representation of a region, denoted with B in FIG. 4, of the screw element.

From FIG. 5 it can be seen that the flanks 24, 26 of the corner domes 22 are respectively provided, at least partially, with a radius R. In other words, the flanks 24, 26 are not configured flat, for instance, but rather the flanks 24, 26 extend along a circular arc segment 46 discernible from FIG. 5, which has the radius R. Hence, the tool engagement portion 20 can also particularly advantageously cooperate with the surface drive mechanism or with a surface drive tool. The respective radius R on the respective flank 24 or 26 here ensures a vertical absorption of the forces emanating from the surface drive tool.

Preferably, it is provided that the height of the head 16, that is to say the so-called head height denoted by the measurement k, is reduced by at least substantially 17 percent in relation to a traditional screw element. The measurement C denotes the height of the collar 18.

In the screw element 10, furthermore, it is provided that—as can be seen in FIG. 5—the corner domes 22 merge into the respective recesses 38 via respective arched and, in the present case, concavely configured foot regions 48.

The measurement pf denotes the depth, running in the direction of longitudinal extent of the shank 12, of the cup arrangement 42, wherein the measurement df denotes the diameter, running in the radial direction of the shank 12, of the cup arrangement 42. The design of the cup arrangement 42 is preferably made with due regard to maximally occurring loads on the head 16, in particular during screwing down and unscrewing. The maintenance of the measurement k' in the corners of the tool engagement portion 20, which maintenance is provided in relation to a traditional screw element, ensures secure assembly when using traditional hexagon or double hexagon box spanners, as well as the necessary flank height for the use of surface drive tools.

The head 16 has in the circumferential direction between the corner domes 22 recesses 38. The depth of the recesses 38 extends as far as the load-bearing support ring 40 responsible for the force transmission. The measurement df denotes also the internal diameter of the support ring 40. The thickness, that is to say the wall thickness of the support ring 40, is designed for the occurring loads. The measurement k' thus denotes the height of the distinct transition region 44 of the corner domes 22.

The invention claimed is:

1. A screw element comprising a shank having a thread and comprising a head connected to the shank, said head having a tool engagement portion which comprises six corner domes arranged evenly distributed in the circumferential direction of the head and comprising respective flanks, by which the head can be brought into positive cooperation with a hexagon socket of a tool for the tightening of the screw element, wherein respective recesses are arranged in the circumferential direction between the corner domes which merge into the respective recesses via respective concave foot regions, wherein the flanks of the corner domes are respectively provided at least partially with a radius, so that they are concavely configured, wherein the flanks of the respective corner dome are connected to each other in the circumferential direction by a transition region, so that the respective corner dome has a rounded tip and wherein said recesses have flat bottom surfaces.

2. The screw element of claim 1 wherein said head comprises a central recess in the form of a cup arrangement and a collar is configured between the head and the shank.

3. The screw element of claim 1 wherein said head comprises a support ring for the corner domes, said ring having an external diameter.

* * * * *